United States Patent [19]

Dupin

[11] Patent Number: 4,805,404

[45] Date of Patent: Feb. 21, 1989

[54] PORTABLE PNEUMATIC MACHINE HAVING EMBODIED CONTROL ELECTRONICS

[75] Inventor: Claude Dupin, Mehun sur Tevre, France

[73] Assignee: Societe d'Exploitation F.F.D.M.-Pneumat, Bourges Cedex, France

[21] Appl. No.: 77,656

[22] Filed: Jul. 24, 1987

[30] Foreign Application Priority Data

Jul. 31, 1986 [FR] France ............................ 86 11141

[51] Int. Cl.[4] ..................... F16B 31/02; B25B 23/145

[52] U.S. Cl. ........................................ 60/409; 81/470

[58] Field of Search .................. 60/407, 409; 81/467, 81/469, 470

[56] References Cited

U.S. PATENT DOCUMENTS

| | | | |
|---|---|---|---|
| 4,404,799 | 9/1983 | Dudek | 60/407 X |
| 4,427,077 | 1/1984 | Hall | 81/470 X |
| 4,685,050 | 8/1987 | Polzer et al. | 81/467 X |

FOREIGN PATENT DOCUMENTS 0082028 6/1983 France .

*Primary Examiner*—Edward K. Look

*Attorney, Agent, or Firm*—Fleit, Jacobson, Cohn & Price

[57] ABSTRACT

A portable pneumatic machine is provided including an incorporated electronic circuit for controlling and monitoring the operation, which circuit is fed with current delivered by an electric generator rotated by the driving pneumatic air, the electric generator having means for delivering signals representative of at least one operating parameter of the machine usable by the incorporated electronic control and monitoring circuit.

11 Claims, 3 Drawing Sheets

PORTABLE PNEUMATIC MACHINE HAVING EMBODIED CONTROL ELECTRONICS

BACKGROUND OF THE INVENTION

Figures 1, 1A:
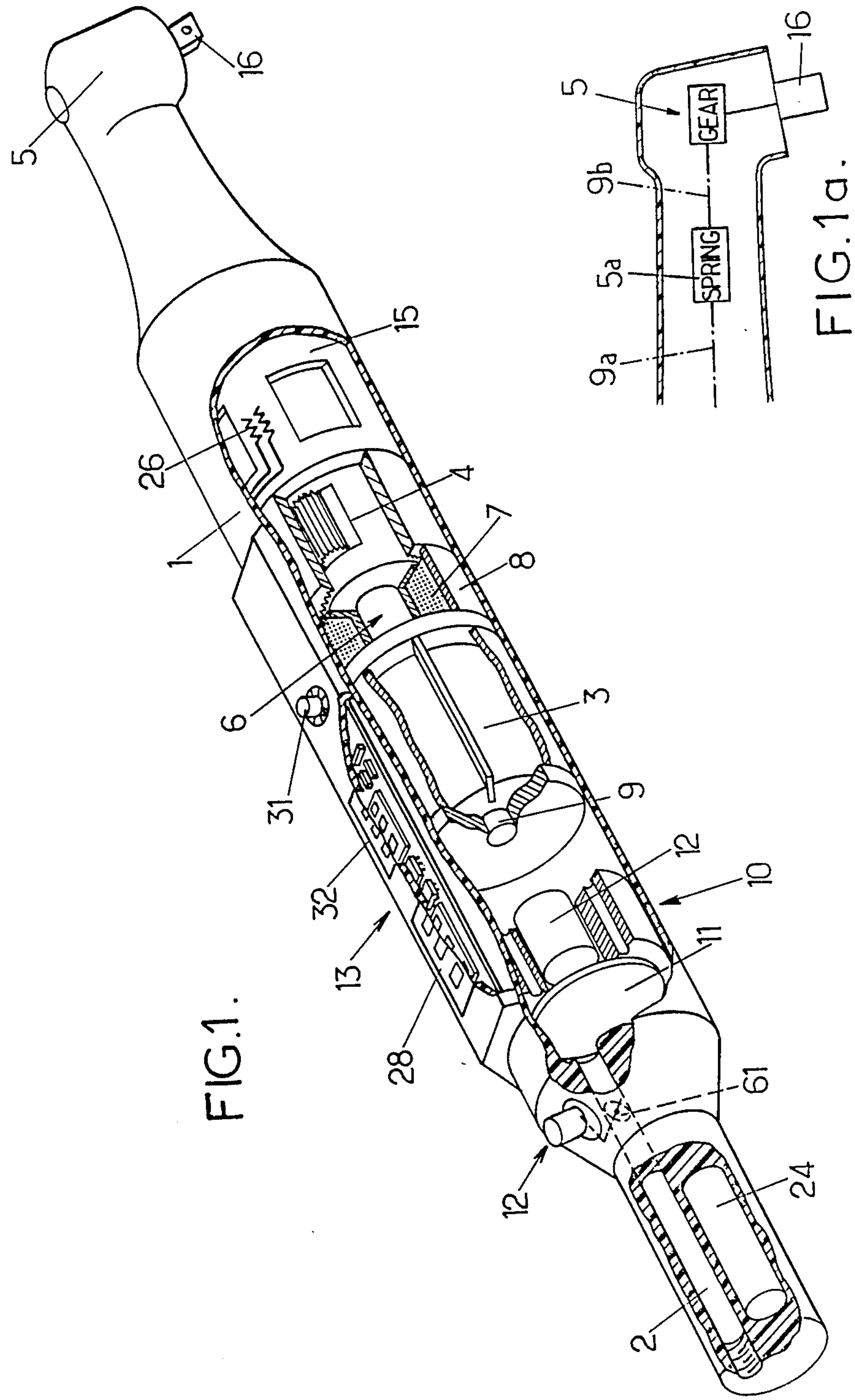

The present invention relates to portable pneumatic machines of the type having a body with a compressed air inlet pipe or tube, rotary pneumatic drive means (bladed turbine or motor for exemple) placed in the body, actuated by the compressed air flow for rotating a tool, a device for adjusting or stopping the airflow feeding the machine and an electric generator including a rotor and a stator installed in the body. The rotor is arranged for being mechanically rotated by the drive means for creating electric energy from the pneumatic power driving the tool.

The invention is particularly suitable, though not exclusively, for portable pneumatic screw drivers, drills, screwers and grinders.

Pneumatic machines of the above defined type are already known. The document FR-A-No. 2 523 891, relating to a rotary pneumatic machine which includes lighting, shows a machine with a rotary member driven by a mechanism enclosed in a case, and actuated by compressed air. The case, having for this purpose means for connection to a compressed air source, includes an electric generator with rotor and stator, the rotor of which is driven by the compressed air feeding mechanism of the machine. This rotor is enclosed in a housing fixable to the case. The generator energizes lightening means carried by the housing for allowing the machine to work in difficult accessible places where the use of a portable lamp is impossible. This machine nevertheless only has a limited interest.

SUMMARY OF THE INVENTION

It is an object of the invention to provide an improved portable pneumatic machine which permits :

control and monitoring of the operating parameters of the machine which do not require the machine to be energized with another power source than the actuating compressed air itself. Thus for example, wires for electrically energizing this machine are avoided. The risks of having them cut accidentally is therefore also avoided which renders the machine safer for its user;

inexpensive control and monitoring of the machine, not substantially increasing the size thereof, which remains thus easy to handle;

a large number of functions which have up to now been little retained by constructors in portable machines due to difficulties for implementing them. Mechanical integrated systems, such as torque limiters, pressure and speed regulators, are in fact complex and have only limited performances and possibilities. The portable pneumatic machine of the invention will in particular allow measurement and regulation of the rotational speed of the tool, clamping of the tool at a predetermined torque and angle and numerous other functions as will be described further on, without requiring an external electric cubicle which is cumbersome and expensive.

To this end, the invention provides more particularly a portable pneumatic machine for rotating a tool comprising:

a body having a compressed air inlet pipe and a casing connected to said inlet pipe to be fed with compressed air by pneumatic feeding means, rotary drive means located within said casing, to be actuated by said compressed air and removably mechanically connected to the tool for rotating said tool, an actuating device for opening and shutting off the compressed air inlet pipe, electric generator means having a rotor to be rotated by said rotary drive means, a stator fixed to the casing and signals delivering means for delivering signals representative of the value of at least one operating parameter of the machine, and an electronic circuit having means for controlling and setting the value of said operating parameter and for monitoring the value of said operating parameter, incorporated into the body of said pneumatic machine, energized by said electric generator means, connected to said signal delivering means of said electric generator means and to the actuating device for controlling said actuating device, whereby control and monitoring of said actuating device allows control of the value of said operating parameter.

It is another object of the invention to provide a machine including an electric generator having signal delivering means which comprise third signal means delivering a signal representative of the rotational speed of the rotary drive means. The electronic circuit for controlling and monitoring the machine has third selecting means for selecting a reference value of this speed and means for maintaining said speed at this reference value. An application of this particularly interesting embodiment may be made to grinders, sanders and other machines whose speed of rotation depends on the pressure exerted by the operator on the support to be machined.

Another object of the invention is to provide a pneumatic machine wherein the signal delivering means of the electric generator means include second signal means for transmitting to the electronic circuit a signal representative of the angular position of the rotary drive means and of the tool, said electronic circuit having second selecting means for selecting a reference value of the angular position of the tool and for controlling the actuating device when the angular position of the tool reaches said reference value. With this arrangement, a screw may be screwed into a support of variable elasticity. An approximative approach brings the support and the screw into contact, this latter than being rotated through a predetermined angle.

Another object of the invention is to provide a portable pneumatic machine wherein the signal delivering means include first signal means for transmitting to the electronic circuit a signal representative of the torque exerted by the rotary drive means on the tool, said electronic circuit having first selecting means for selecting a torque reference value for the maximum output torque value of said rotary drive means and for controlling the actuating device when the torque value has reached said reference value. When the torque has reached the reference value, the air is cut off.

An object of the invention is also to provide a portable screw driver wherein the electronic circuit further comprises measuring means for measuring the torque value increase during operation of the machine with respect to time, first anticipating means for anticipating from said measuring of the torque value increase a remaining torque value increase necessary to follow for reaching the torque reference value, computing means setting a reference time $t_0$ and deducing from said remaining torque value increase a remaining tightening time t from said reference time $t_o$ for reaching said torque reference value, and means for actuating the actuating device arranged to shut off the compressed air inlet pipe after the time t starting from said reference time $t_o$, whereby the tool is precisely stopped when the torque reference value is reached.

The electronic circuit further comprises measuring means for measuring the torque value increase during operation of the machine with respect to angular position of the rotating drive means, second anticipating means for anticipating from said measuring of the torque value increase a remaining torque value increase necessary to follow for reaching the torque reference value, computing means setting a reference angle $\alpha_o$ and deducing from said remaining torque value increase a remaining tightening angle $\alpha$ from said reference angle $\alpha_o$ to be rotated for reaching said torque reference value and means for actuating the actuating device arranged to shut off the compressed air inlet pipe after rotation of the angle $\alpha$ starting from said reference angle $\alpha_o$.

Such an arrangement allows to stop the tool at a very precise position. Effectively, if the shut off of the compressed air inlet pipe is actuated only when the reference or setting value is reached, a slight delay may occur before a complete stop is attained, therefore inducing a slight overrun of said reference value.

With the above-mentioned means for measuring, anticipating, computing and controlling (with a temporisation for example) the actuating device, the shutting of the compressed air can be initiated slightly before reaching the reference value, in order to obtain the stop of the tool very precisely at this reference value.

The portable pneumatic machine may also include elastic means wherein it further includes an elastic device arranged to slow the rotary drive means on operation therefore increasing time for reaching from a predetermined initial torque value, the torque reference value, whereby it ameliorates tightening precision.

Such elastic means are known per se and may include an helicoidal spring arranged to be solicited either in traction or in compression; any elastic material should also be used instead of such a spring.

In an advantageous embodiment, the first signal means for transmitting a signal representative of the torque exerted by the rotary drive means includes a deformable piece adapted for securing the drive means against rotation and supporting at least one sensor. This latter may be of the strain gauge type or else, of the piezoelectric pressure sensor type or similar.

Other objects of the invention are to provide the following arrangements:

means for storing the electric energy delivered by the generator, such as a battery of accumulators, of the nickel-cadmium type for example, are included in the body of the machine;

at last one display screen for displaying the operating and/or reference for setting parameters for said machine is fixed on the body;

the electronic monitoring and control circuit is programmable (it includes programmable logic control means);

means for storing the operating parameters of the machine are connected to the electronic monitoring and control circuit; they are supported by the body of the machine and may be removed from the body, which allows the results to be used without having to stop the machine.

The invention will be better understood from the following description of particular embodiments given by way of example only.

SHORT DESCRIPTION OF THE DRAWINGS

Figure 2:
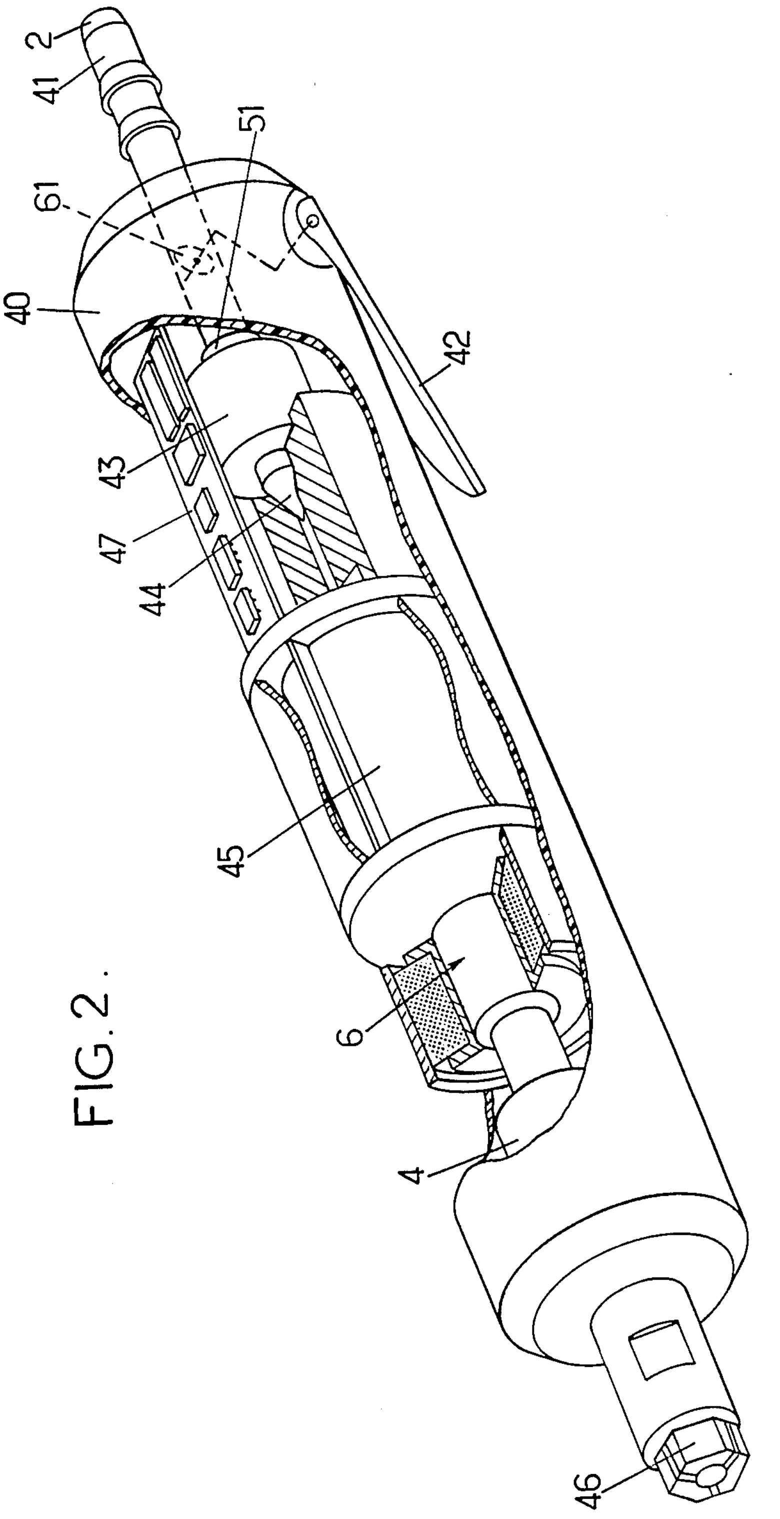
Figure 3:
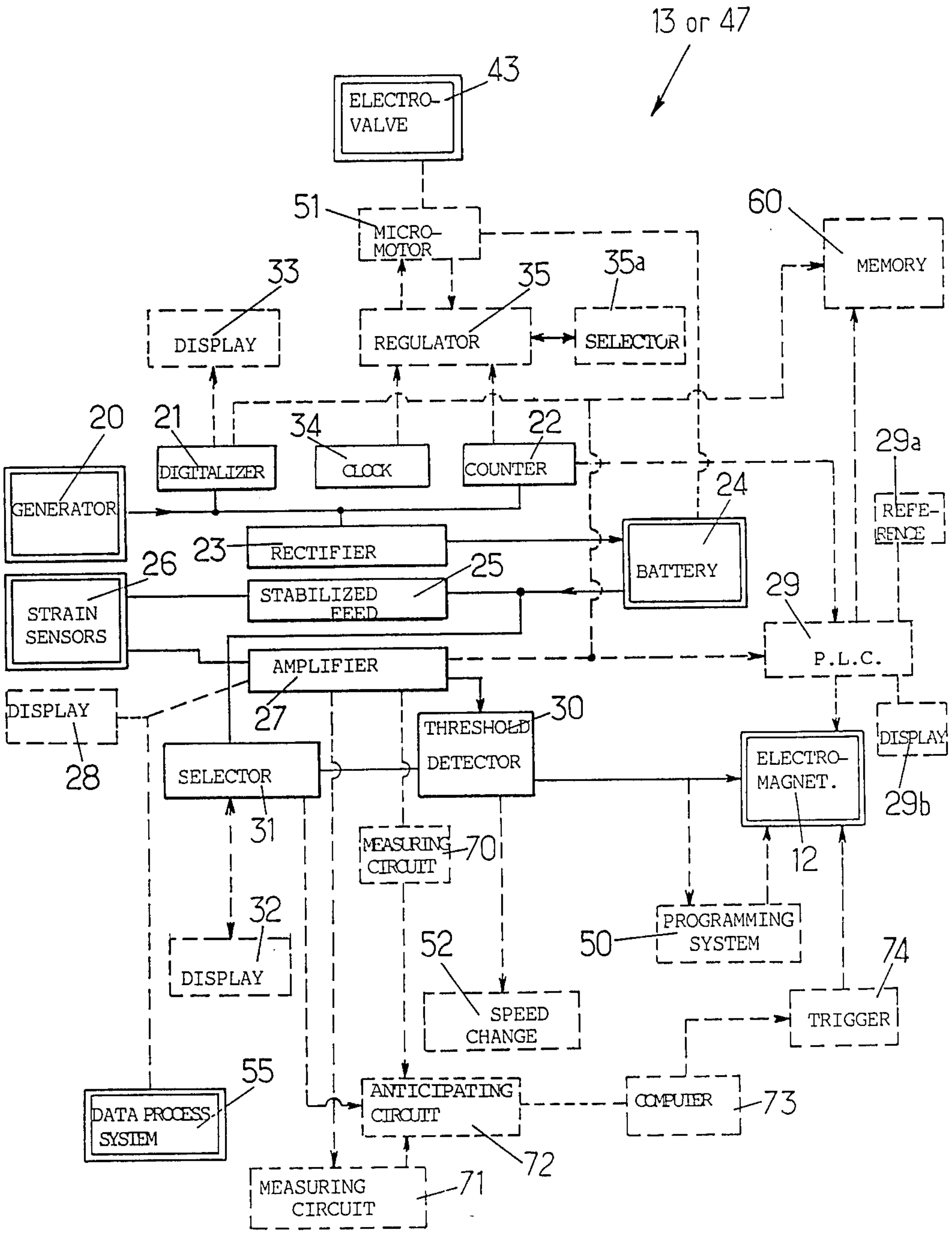

FIG. 1 is a perspective view partially in section of a machine in accordance with the invention, for screwing and providing monitoring of the tightening torque and of the angular position of the tool;

FIG. 1*a* is a partial schematic view in section showing a part of FIG. 1;

FIG. 2 is a perspective view, partially in section, of another embodiment of the invention, for grinding for example, with the speed regulation; and FIG. 3 is a block diagram of the monitoring and control circuit of the portable pneumatic machine of the invention.

FIG. 1 shows a hand screw driving machine with incorporated control of the output torque of the machine and of the screwing angle of the tool adaptable to the spindle of the screw driving machine constructed in accordance with the invention, it has a body 1 having a casing and which may be made from hard plastic or metal or any other adequate material. Through a compressed air inlet pipe 2 the machine is powered and a bladed motor 3 is driven in rotation. This bladed motor 3 drives the tool (not shown) through a reducer 4 and a bevel gear 5. The reducer is for example of the epicycloidal type.

The motor driven reducer assembly 3, 4 is mounted freely rotating in the casing of the body 1 held manually by the operator. Electric generator means 6 including a rotor 7 and a stator 8 is rigidly connected to the shaft 9 of the bladed motor 3 which is adapted for mechanically rotating the rotor 7. An actuating device 10 for air cutting includes a closure valve 11, an electromagnet 12 adapted to be actuated by an electronic circuit 13 for controlling and monitoring the operation of the pneumatic machine. Circuit 13 is incorporated or included in body 1 and is energized with current delivered by the electric generator means 6. Generator means 6 comprises signal delivering means to deliver signals representative of at least one operating parameter to be used by the circuit 13. A manual control 12*a*, shown in the form of a push button in FIG. 1 allows the compressed air supply valve 61 to be opened, placed in front of valve 11, in the air inlet 2. This control may also, and for example, be in the form of a lever 42 (see FIG. 2).

In a variant, valve 11 is closed in the rest position and the manual control 12a will provide opening thereof without any additional supply valve 61.

FIG. 3 shows a block diagram of the control and monitoring portions of an electronic circuit 13 in accordance with the invention, energized by the incorporated electric generator. The elements of the basic electronic circuit have been shown with continuous line blocks, with double continuous lines the elements external to the circuit and with broken lines the additional control and monitoring elements of the electronic circuit adapted to a specific use. The blocks are connected together by continuous or broken lines showing schematically the main electric connections. This schematical graphic representation in no way implies the number of conductor required for conveying the power or the electric information necessary for operation of the device. Furthermore, other connections are quite possible allowing certain elements such as the storage battery to be bypassed for example. These variants are readily conceivable for the man skilled in the art and will not be discussed further.

The elements shown in this block diagram are formed from electronic components known per se, separated or in the form of integrated circuits. They do not require particular explanations.

Electric generator means comprise an electric generator 20 which energizes a voltage rectifier 23 and also delivers directly signals representative of the operating parameters of the machine through signal delivering means comprising a voltage digitalizer 21 and a pulse counter 22. The voltage rectifier 23 is connected to a battery storage 24 integrated in the body 1 of the machine, placed for example close to the compressed air inlet pipe 2 of the machine (see FIG. 1). Battery 24 energizes the strain sensors 26 through stabilized feed means 25. These strain sensor may be strain gauges, or else, pressure sensors of the piezoelectric type or similar. These sensors are fixed to a deformable support piece 15, adapted for securing the bladed motor 3 and its associated reducer 4 against rotation. They are connected to the electronic circuit controlling and monitoring the operation of the machine and are arranged to deliver a signal representative of the torque exerted by the turbine 3 on the deformable piece through a voltage amplifier 27.

This voltage amplifier 27 feeds display means 28 such as a display screen for displaying the measured torque value. Through a programmable logic controller 29 or through a threshold detector 30, the amplifier 27 drives the electromagnet 12 for opening or closing valve 11; the threshold connector 30, connected to selecting means 31 delivering an adjustable reference value (potentiometer, keyboard, or any means for introducing external data) and which may be connected to display means 32 (either or not identical or the same than display means 28) displaying the reference value, controls the electromagnet by comparing with the data coming from the voltage amplifier 27.

Thus, when the strain sensor indicates a value equal to the reference of selecting means 31, a control instruction is given. In the case of limitating the torque applied to a working spindle 16 by the machine to a maximum value, it shuts the compressed air inlet.

Other cases are possible, particularly when it is desired to stop the tool in a given angular position from a pretightening or initial approximative torque. In this case the control instruction drives for example a timing circuit. In a special embodiment of the invention, memory means 60 for storing the operating parameters are connected to the electronic circuit, for example to the digitalizer 21, to the voltage amplifier 27 and/or to the programmable logic controller. These means, carried by the body of the machine, may be included in a housing removable from the body.

FIG. 2 shows a grinder with electronic speed regulation in accordance with the invention. It includes a body 40, a compressed air supply connection 41 which may for example be of the fast connection type and a manual actuator 42 shown in the figure in the form of a lever, but which may be a button or any other known means. An electric valve 43, with obturating needle 44 controlled by a micromotor 51 fed by the electric generator, contols the compressed air flow feeding the bladed motor 45 which rotates the spindle 46 on which the tool (not shown) is fixed.

The operation of the electrovalve 43 is controlled through the electronic circuit 47 of the type including at least some of the elements shown in FIG. 3. The information concerning the rotation of spindle 46 is fed to the electronics from the output of the electric generator 20 of electric generator means 6. The voltage digitalizer 21 generates a signal representative of the rotational speed of the spindle during operation then delivered to display means 33 displaying the speed value. A clock 34, energized or not by the generator, and the pulse counter 22 connected to the output of generator 20 are connected to regulating means 35 for maintaining the speed at a regulated reference value selected through selecting means 35 adapted for adjusting valve 43 for modulating the air intake. The speed of the machine may then be increased or decreased, after comparison of the measured speed with a reference speed stored in the electronics through selecting means 35a.

The pulse counter 22 also generates signals representative of the rotational angles of the output spindle. Through programmable logic controller (PLC) 29 it drives the electromagnet 13. PLC 29 is connected to selecting means for selecting a reference value 29*a* of the desired rotational angle and may be connected to means 29*b* displaying this angle. Thus, the machine is stopped when the measured rotational angle becomes equal to a value given by the reference means 29*a*.

During tests carried out on the machine in accordance with the invention, an accuracy of the order of a degree was obtained. The tool in fact rotates very slowly when a given angular rotation of the spindle is effected; since the torque exerted in moreover sufficient, cutting off the compressed air causes a practically immediate stop.

However, in order to obain the stop precisely and exactly on the preset reference value, the electronic circuit 13 may further comprise measuring means 70, 71 connected to amplifier 27 for measuring the torque value increase during operation of the machine with respect to time, given for example by clock 34, (connection not shown) or to angular position of the rotation drive means given by pulse counter 22 (connection not shown), anticipating means 72 connected to torque selecting means 31 and to measuring means 70, 71 for anticipating from said measuring of the torque value increase a remaining torque value increase necessary to follow for reaching the torque reference value, computing means 73 setting a reference time $t_o$ or a reference angle $\alpha_o$ and deducing from said remaining torque value a remaining tightening time t or angle $\alpha$ from said reference $t_o$ or $\alpha_o$ and necessary to reach said torque reference value.

Said measuring means, anticipating means (comprising for example a RAM for storing the measured values, comparing and calculating means for elaborating a prospective increase curb . . . ) and computing means are known per se and would be easily obtained by the man skilled in the art either with separated or integrated circuits.

Means 74 for shutting the compost air inlet pipe after the time t or rotation of the angle $\alpha$ and connected to computing means 73 ensure a precise stop, coinciding with the exact reaching of the torque reference value, by actuating the electromagnet 12.

To further ameliorate the machine of the invention and increase the accuracy of the stop at the exact reference value (torque, or angle) elastic means $5_a$ may be added, for example inside the body of the machine, near bevel gear 5 as schematically shown on FIG. 1, creating a differential rotation between part $9_a$ of shaft 9 driven by the rotary drive means and part $9_b$ rigidly connected to the tool via the spindle 16.

Such means easy to conceive for the man skilled in the art will not be further discussed.

Other elements may be advantageously added to this circuit for controlling and monitoring a pneumatic machine of the invention. For example, a system 50 for programming the screwing time in the case where the machine is a screw driving machine. It is moveover possible, through a speed change device 52, to modify the operating parameters of the machine for example so as to have a different working speed.

The operation of the machines constructed in accordance with the invention is explained hereafter. The compressed air is fed to the machine through a connection on the compressed air feed pipe 2. The tool is then stopped. By adjusting the control means 12, 42 (closure valve 11 being open or the screw needle 44 being preadjusted to a given position), the compressed air feeds the rotary drive means 3, 45 driving the reducer 4 which rotates the spindle 16, 46 on which the tool is fitted. Simultaneously, the rotary means 3 drive the current generator 6. The current is then stored for example in the battery 24 which serves for the general power supply of the electronic circuit 13 for control and monitoring.

In the case of a screw driving machine, and previously, the operator will have stored, through means 31 (keyboard, potentiometer . . . ) the reference value of the maximum torque which he desires to reach during screwing. The screw is then screwed in and the torque rises during screwing. When the strain sensors transmit a representative signal giving a torque of a value equal to the reference value, energization of the electromagnet 13 causes valve 11 to close and the machine to stop. In case of addition to the electronic circuit 13 of means 70, 71, 72, 73 and 74, accuracy of the stopping is increased as already explained.

In the case of the operation of a grinding type machine, the operator enters the speed at which he desires his grinding operation to be effected through means 35 selecting a reference value through 35*a*. During grinding, the surface condition of the work piece to be ground, the manual pressure exerted by the operator and the condition of the tool will vary. The rotational speed, a function of these parameters, will then also vary causing the air intake to be regulated by acting through the regulation means 34 on the needle valve 44 as described above, by acting on the micromotor 51.

As it is evident, and as it follows moreover from what exposed before, the invention is in no wise limited to those of its modes of application and embodiments which have been more especially considered; it includes for example means which, particularly in the case of screw driving machines, permits:

the screwing of self tapping screws in work pieces requiring a screwing torque greater than the tightening torque, approach tightening at high speed and screwing down of the screw or nut at slow speed, but with a higher torque, marking with paint the screws or nuts tightened, programmable tightening times, automatic speed changes.

For grinders, screw cutters and drills:

in addition to the regulation of the rotational speeds, speed programming particularly so as to have progressive start up.

With the machines of the invention, a better quality in the work carried out by the operator and a better control of this work are possible. Through the display of the operating parameters on the machine the operator may permanently adapt himself to his particular working conditions.

Outputs may also be provided on the machine to which separated equipment may be connected. A dialogue between the electronic control and monitoring circuit incorporated in the machine and external data processing systems 55 (recording of the operating parameters for example) is then possible. Modifications concerning the adjustments of the machine itself, or else the slaving of the machine to a fixed station on which the portable machine of the invention is mounted or, more generally, its use by a robot are then possible.

By way of example, there may be mentioned the automatic withdrawal of a boring machine for removal of the borings when the working torque reaches a predetermined maximum value.

I claim:

1. A portable pneumatic machine for rotating a tool comprising:

a body having a compressed air inlet pipe and a casing connected to said inlet pipe to be fed with compressed air by pneumatic feeding means, rotary drive means located within said casing, to be actuated by said compressed air and removably mechanically connected to the tool for rotating said tool, an actuating device for opening and shutting off the compressed air inlet pipe, electric generator means having a rotor to be rotated by said rotary drive means, a stator fixed to the casing and signal delivering means for delivering signals representative of the value of at least one operating parameter of the machine, an electronic circuit having means for controlling and setting the value of said operating parameter and for monitoring the value of said operating parameter, incorporated into the body of said pneumatic machine, energized by said electric generator means, connected to said signal delivering means of said electric generator means and to the actuating device for controlling said actuating device, whereby control and monitoring of said actuating device allows control of the value of said operating parameter, and programmable logic controller means for programming the electronic circuit, 2. The portable pneumatic machine according to claim 1, wherein the signal delivering means include first signal means for transmitting to the electronic circuit a signal representative of the torque exerted by the rotary drive means on the tool, said electronic circuit having first selecting means for selecting a torque reference value for the maximum output torque value of said rotary drive means and for controlling the actuating device when the torque value has reached said reference value.

3. The portable pneumatic machine according to claim 2, wherein the signal delivering means of the electric generator means include second signal means for transmitting to the electronic circuit a signal representative of the angular position of the rotary drive means and of the tool, said electronic circuit having second selecting means for selecting a reference value of the angular position of the tool and for controlling the actuating device when the angular position of the tool reaches said reference value.

4. The portable pneumatic machine according to claim 2, wherein the first signal means for transmitting a signal representative of the torque exerted by the rotary drive means include a deformable piece arranged for securing the rotary drive means against rotation and supporting at least one strain sensor.

5. A portable pneumatic machine for rotating a tool comprising:

a body having a compressed air inlet pipe and a casing connected to said inlet pipe to be fed with compressed air by pneumatic feeding means, rotary drive means located within said casing, to be actuated by said compressed air and removably mechanically connected to the tool for rotating said tool, an actuating device for opening and shutting off the compressed air inlet pipe, electric generator means having a rotor to be rotated by said rotary drive means, a stator fixed to the casing and signals delivering means including third signal means for delivering signals representative of the rotational speed of the rotary drive means, and an electronic circuit having means for controlling and setting the value of said rotational speed and for monitoring the value of said rotational speed, including third selecting means for selecting a reference value of the rotational speed and adjusting means for maintaining said rotational speed at said reference value, said electronic circuit being incorporated into the body of said pneumatic machine, energized by said electric generator means, connected to said signal delivering means of said electric generator means and to the actuating device for controlling said acuating device, whereby control and monitoring of said actuating device allows control of the value of said rotational speed.

6. The portable pneumatic machine according to claim 1 or 5, wherein the body comprises electric storing means for storing the electric energy delivered by the electric generator means, such as a storage battery.

7. The portable pneumatic machine according to claim 1 or 5, wherein it includes at least one display screen associated with the electronic circuit for displaying the value of at least one of operating parameter or of a reference value to which said operating parameter should be set, said screen being fixed to the body of the machine.

8. The portable pneumatic machine according to claim 1 or 5, wherein it includes data storing means for storing at least one operating parameter of the machine, said data storing means being carried by the body of the machine.

9. A portable pneumatic machine for rotating a tool comprising:

a body having a compressed air inlet pipe and a casing connected to said inlet pipe to be fed with compressed air by pneumatic feeding means, rotary drive means located within said casing, to be actuated by said compressed air and removably mechanically connected to the tool for rotating said tool, an actuating device for opening and shutting off the compressed air inlet pipe, electric generator means having a rotor to be rotated by said rotary drive menas, a stator fixed to the casing and signals delivering means including first signal means for delivering signals representative of the torque exerted by the rotary drive means on the tool, and an electronic circuit having means for controlling and setting the value of said torque parameter and for monitoring the value of said torque parameter, said electronic circuit having first selecting means for selecting a torque reference value for the maximum output torque of said rotary drive means and for controlling the actuating device when the torque value has reached said reference value, said electronic circuit being incorporated into the body of said pneumatic machine, energized by said electric generator means, connected to said signal delivering means of said electric generator means and to the actuating device for controlling said actuating device, whereby control and monitoring of said actuating device allows control of the value of said torque parameter, wherein the electronic circuit further comprises measuring means for measuring the torque value increase during operation of the machine with respect to time, first anticipating means for anticipating from said measuring of the torque value increase a remaining torque value increase necessary to follow for reaching the torque value, computing means setting a reference time $t_o$ and deducing from said remaining torque value increase a remaining tightening time t from said reference time $t_o$, necessary to reach said torque reference value and means for actuating the actuating device arranged to shut off the compressed air inlet pipe after the time t starting from said reference time $t_o$, whereby the tool is precisely stopped when the torque reference value is reached.

10. A portable pneumatic machine for rotating a tool comprising:

a body having a compressed air inlet pipe and a casing connected to said inlet pipe to be fed with compressed air by pneumatic feeding means, rotary drive means located within said casing to be actuated by said compressed air and removably mechanically connected to the tool for rotating said tool, an actuating device for opening and shutting off the compressed air inlet pipe, electric generator means having a rotor to be rotated by said rotary drive means, a stator fixed to the casing and signals delivering means including first signal means for transmitting a signal representative of the torque exerted by the rotary drive means on the tool and second signal means for delivering a signal representative of the angular position of the rotary drive means and of the tool, and an electronic circuit having means for controlling and setting the value of said torque and said angular position and for monitoring the value of said torque and said angular position, said electronic circuit having first selected means for selecting a torque reference value for the maximum output torque value of said rotary drive means and for controlling the actuating device when the torque value has reached said reference value, second selecting means for selecting a reference value of the angular position of the tool and for controlling the actuating device when the angular position of the tool reaches said reference value, said electronic circuit being incorporated into the body of said pneumatic machine, energized by said electric generator means, connected to said signal delivering means and said electric generator means and to the actuating device for controlling said actuating device, whereby control and monitoring of said actuating device allows control of the value of said torque and angular position, wherein the electronic circuit further comprises measuring means for measuring the torque value increase during operation of the machine with respect to angular position of the rotating drive means, second anticipating means for anticipating from said measuring of the torque value increase the remaining torque value increase necessary to follow for reaching the torque reference value, computing means setting a reference angle $\alpha_o$ and deducing from said remaining torque value increase a remaining tightening angle $\alpha$ from said angle $\alpha_o$ to be rotated for reaching said torque reference value and means for actuating the actuating device arranged to shut off the compressed air inlet pipe after rotation of the angle $\alpha$ starting from said reference angle $\alpha_o$.

11. A portable pneumatic machine for rotating a tool comprising:

a body having a compressed air inlet pipe and a casing connected to said inlet pipe to be fed with compressed air by pneumatic feeding means, rotary drive means located within said casing, to be actuated by said compressed air and removably mechanically connected to the tool for rotating said tool, an actuating device for opening and shutting off the compressed air inlet pipe, electric generator means having a rotar to be rotated by said rotary drive means, a stator fixed to the casing and signals delivering means including first signal means for delivering signals representative of the torque exerted by the rotary drive means on the tool, and an electronic circuit having means for controlling and setting the value of said torque parameter and for monitoring the value of said torque parameter, said electronic circuit having first selecting means for selecting a torque reference value for the maximum output torque of said rotary drive means and for controlling the actuating device when the torque value has reached said reference value, said electronic circuit being incorporated into the body of said pneumatic machine, energized by said electric generator means, connected to said signal delivering means of said electric generator means and to the actuating device for controlling said actuating device, whereby control and monitoring of said actuating device allows control of the value of said torque parameter, wherein it further includes an elastic device arranged to slow the rotary drive means on operation therefore increasing time for reaching, from a predetermined initial torque value, the torque reference value, whereby it ameliorates tightening precision.

* * * * *